April 19, 1966     D. R. SNOEYENBOS     3,246,711
REVERSIBLE AIR BEARING SUPPORT Filed Jan. 27, 1964

INVENTOR.
David R. Snoeyenbos
BY W. F. Wagner
ATTORNEY

United States Patent Office 3,246,711
Patented Apr. 19, 1966

3,246,711
REVERSIBLE AIR BEARING SUPPORT
David R. Snoeyenbos, Santa Barbara, Calif., assignor to General Motors Corporation, Detroit, Mich., a corporation of Delaware
Filed Jan. 27, 1964, Ser. No. 340,450
3 Claims. (Cl. 180—7)

This invention relates to air bearing devices and more particularly to air bearings of the type in which a single convolution annular flexible diaphragm is secured peripherally and centrally beneath a rigid load supporting platform.

In copending applications Serial No. 4,465, Harry A. Mackie et al., entitled "Air Cushion Vehicle," and Serial No. 161,048, now Patent No. 3,167,145, Harry A. Mackie, entitled, "Pendant Air Bearing Load Supporting Device," both assigned to General Motors Corporation, it has already been proposed to utilize an air bearing construction of the type described in two functionally opposite modes of operation; first, under conditions of superatmospheric energization in which the device sustains a load in frictionless relation to the ground, and second, under conditions of subatmospheric energization in which the device operates to exert an attraction force in frictionless relation to a surface. In the latter case, the device is of course adaptable to produce either a load on a ground engaging member or to suspend a given load relative to a surface spaced from the ground.

In addition to general structural similarity, both of the above-noted devices utilize a flexible membrane or diaphragm which may be identical in shape and free convolution, the difference in function resulting from dissimilarity in porting of the annular chamber formed between the diaphragm and platform and the central plenum cavity formed between the diaphragm and the ground. In the former case, the device is provided with passage means permitting simultaneous energization of both the annular chamber and plenum cavity with superatmospheric pressure, while in the latter case the device is provided with passage means permitting creation of subatmospheric pressure in the plenum cavity only, while additional passage means enable the entrance of atmospheric pressure into the annular cavity. For purposes of clarity hereinafter, the first mentioned type will be referred to as a positive air bearing while the latter will be referred to as a negative air bearing.

The present invention is directed to improvements in the noted air bearing constructions whereby the passage means peculiar to each mode of operation is automatically correlated with energization air pressure condition so as to produce a convertible air bearing structure which may be operated as either a positive or negative bearing by merely reversing the direction of air flow.

An object of the present invention is to provide an improved air bearing construction.

A further object is to provide an air bearing unit which is automatically convertible from positive to negative operation responsive to reversal of direction of flow of the pressure energization device utilized.

Another object is to provide an improved air bearing of the type utilizing a single convolution annular diaphragm connected centrally and peripherally to a load supporting platform.

Still another object is to provide a device of the stated character wherein the diaphragm forming the flexible plenum chamber is provided with apertures located radially in relation to the lowermost extremity of the convolution such that reversal of flow of air induces a shift in the cross-sectional profile of the diaphragm sufficient to displace the aperture either outboard or inboard of an imaginary circle defining the boundary of the plenum cavity support area.

A still further object is to provide a device of the stated character wherein the aperture means occupies a position providing communication between the annular cavity and the plenum cavity when the device is energized by superatmospheric air, and a position preventing such communication while establishing communication between the annular cavity and atmosphere when the device is energized by subatmospheric air.

These and other objects, advantages and features of the invention will become more fully apparent as reference is had to the accompanying specification and drawings wherein.

Figure 1:
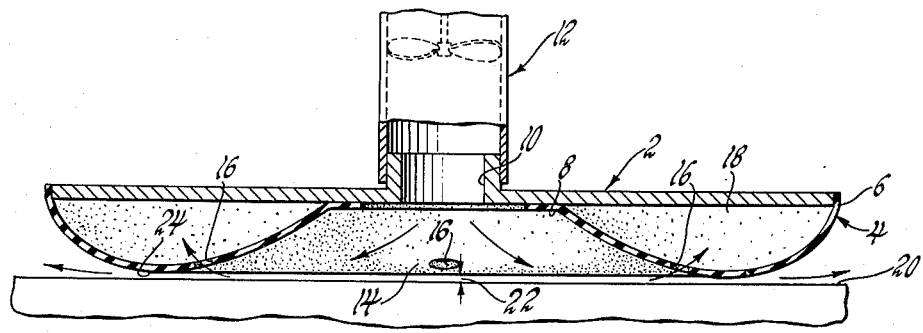
FIGURE 1 is a side elevational view of a plenum chamber type air bearing incorporating the invention, with the elements thereof being shown in the relation assumed under conditions of superatmospheric energization.

Referring now to the drawings and particularly FIGURE 1, the reference numeral 2 designates a substantially rigid platform, which in the embodiment shown is circular in plan form. Disposed beneath platform 2 is an annular single convolution flexible membrane or diaphragm 4 having its outer periphery 6 connected in sealed relation with the outer perimeter of platform 2 and its inner periphery 8 sealingly connected centrally beneath platform 2 in generally concentric relation with a central opening 10 formed in the latter. In the embodiment shown, reversible air flow generating device 12 in the form of an axial flow blower is mounted over the opening 10. Device 12 is selectively operable to provide continuous flow of air either downwardly into the plenum cavity 14 or upwardly from cavity 14 to atmosphere. It will, of course, be understood that device 12 is merely illustrative of many conventional sources of air flow generation and the invention is, therefore, not to be considered as limited in any sense to the specific type shown. FIGURE 1 illustrates the convolution profile assumed by diaphragm 4 when the air flow generating means is operated so as to produce flow of air into plenum cavity 14. Under such conditions, superatmospheric air enters cavity 14 through opening 10 and simultaneously passes through the plurality of apertures 16 formed in diaphragm 4 into the annular chamber 18 formed between diaphragm 4 and the platform 2 whereby the latter is lifted to an elevated position above the ground line 20, while the superatmospheric cushion of air in cavity 14 exerts a lifting force which sustains the entire device in frictionless relation to the ground. Since the diaphragm 4 and platform 2 are both maintained in spaced relation from the ground, continuous loss of air from cavity 14 occurs through the perimetrical throttling gap or choke 22 formed between the lowermost extremity 24 of diaphragm 4 and the ground. However, because the throttling gap is very shallow in vertical dimension, flow of air therethrough from plenum 14 is restricted so that optimum lift efficiency is obtained with minimum requirement for replenishment of air in the plenum chamber.

The shallowness of throttling gap 22 also requires that air emerging therethrough travel at relatively high velocity and hence at a pressure level lower than that of the air confined in plenum cavity 14. Since the pressure in chamber 18 is equal to the pressure in cavity 14, a pressure differential is created at opposite sides of the lowermost extremity 24 of the diaphragm which tends to maintain the diaphragm in close proximity with the ground, while the pressure in cavity 14 exerts lift on the entire structure. Accordingly, within limits, the convolution profile of diaphragm 4 automatically varies so that the imaginary circle formed by the lowermost extremity varies in diameter as a function of load on platform 2 and pressure in cavity 14. That is to say, within a limited range of variation in plenum pressure, the diaphragm convolution profile changes so as to form a progressively changing circular throttling gap, the depth of which is relatively constant. Thus, if the pressure in the plenum chamber is relatively high, the platform is elevated to a relatively high position while the diaphragm convolution, in its effort to maintain the throttling gap 22, will progressively approach a symmetrical curve so that the lowermost portion 24 defines a circular throttling gap of relatively small diameter. Conversely, if either the load is increased while the pressure remains unchanged, or alternatively, the pressure is reduced without change in load, the diaphragm automatically changes profile so that the imaginary circle defined by the throttling gap expands to a larger diameter while maintaining the relatively constant vertical dimension. Because of this singular characteristic, the device may best be described as a self-modulating flexible choke air bearing.

Figure 2:
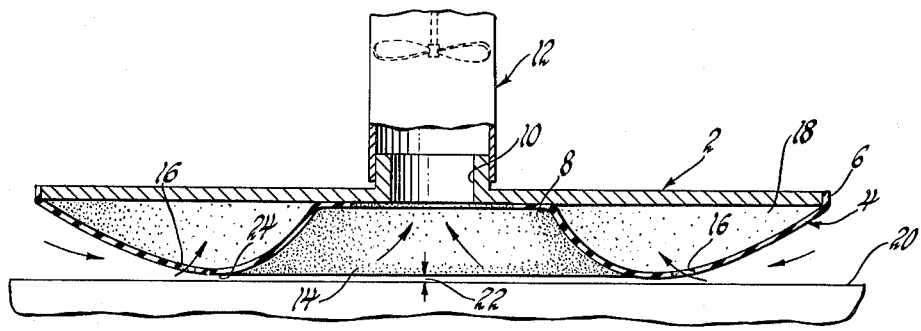
FIGURE 2 is a view similar to FIGURE 1 showing the relation of the elements thereof when the device is subjected to subatmospheric pressure.

The device shown in FIGURE 2 is physically identical to that shown in FIGURE 1 and in operation is essentially the corollary thereof. That is to say, when the blower 12 is operated so that air is drawn from the plenum cavity 14 and expelled to atmosphere, a subatmospheric pressure condition is created in cavity 14 while the diaphragm simultaneously assumes a cross-sectional configuration which is the reverse of that obtained when the device is energized by superatmospheric air. In the device shown in FIGURE 2, assumption of the diaphragm convolution shown therein is accomplished by the admission of atmospheric air into the annular chamber 18 through the plurality of apertures 16 which are located outboard of the imaginary circle formed by the throttling gap 22. It will, of course, be understood that as air is withdrawn from plenum cavity 14 by the blower, air flows from atmosphere into plenum 14, which flow is regulated by the depth of the throttling gap 22 in the same way as exhaust of air therethrough is regulated in the structure of FIGURE 1. As will be evident from a comparison of FIGURE 1 and FIGURE 2, the cross-sectional profile of the diaphragm 4 reverses when the direction of air flow is reversed with the result that the profile of the diaphragm at the left hand side of FIGURE 1 corresponds to the profile of the diaphragm at the right hand side of FIGURE 2. In addition, the structure of FIGURE 2 has been found to exhibit the additional functional similarity of varying the effective diameter of the imaginary circle defined by the throttling gap 22 in a manner which is the reverse of the response exhibited by the structure of FIGURE 1. That is, when the external lifting force is applied to elevate the platform 2, the diaphragm convolution progressively changes profile in a radially outward direction until the maximum condition wherein the diaphragm profile reaches a symmetrical curve. Similarly, when the external force is progressively relieved, the imaginary circle contracts to a smaller diameter.

Because of the related behavior characteristics of the device under opposite conditions of pressure energization, according to the present invention the apertures 16 in diaphragm 4 are so located as to function alternately to either enable the establishment of corresponding pressures in cavity 14 and annular chamber 18, or alternately, to render the chamber 18 communicable with atmosphere.

Figure 3:
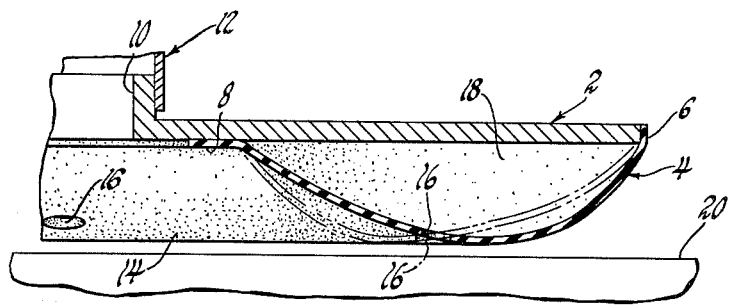
FIGURE 3 is an enlarged sectional composite view of a portion of the device shown in FIGURES 1 and 2.

In FIGURE 3, composite views of typical profile configurations of diaphragm 4 are shown in superimposed relation. From this view, it will be evident that the apertures 16 lie inboard of the imaginary circle defined by the lowermost extremity 24 when the device is subjected to superatmospheric pressure, while the same apertures shift to a position outboard of the imaginary circle defined by the lowermost extremity of the diaphragm when the device is subjected to subatmospheric pressure. While it has been found that the amount of radial shift of the aperture 16 under the two conditions of operation varies according to the extent of free convolution, with greater radial shift occurring in inverse proportion to the extent of convolution, in all cases optimum shift occurs when the aperture is located midway between the inner and outer periphery of the diaphragm. As used herein, the term "midway" is intended to mean a point equidistant from the inner and outer periphery measured along the surface of the diaphragm. It will also be understood that the terms "inner" and "outer" peripheries as used herein refer to the extremities thereof which are capable of movement relative to the platform 2.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:

1. A reversible air bearing device comprising, a rigid annulus and a flexible annulus having their respective circumferential boundaries secured together to form an inflatable annular chamber of variable cross sectional shape, air flow generating means mounted on said rigid annulus over the central opening formed by the inner boundary of said annuli selectively operable to induce flow of air from the rigid annulus side to the flexible annulus side and vice versa, and aperture means in said flexible annulus located a distance radially from the geometric center thereof which is inboard of the lowermost extremity of said flexible annulus during flow of air from the rigid annulus side to the flexible annulus side and outboard of said lowermost extremity during flow of air from said flexible annulus side to said rigid annulus side.

2. A reversible air bearing device comprising a rigid annular platform, a flexible annular diaphragm disposed over one surface of said platform having its inner and outer margins connected to said platform in sealed relation to form a surface proximate single convolution of variable cross sectional profile, means for selectively inducing air flow from the platform side to the diaphragm side and vice versa through the central opening formed by the inner margins, and aperture means formed in said diaphragm approximately midway between the inner and outer margins thereof.

3. The structure set forth in claim 2 wherein said aperture means comprise a plurality of openings arranged in spaced relation along a circumference concentric with the geometric center of said diaphragm.

References Cited by the Examiner

UNITED STATES PATENTS 3,164,103  1/1965  Lathers et al. _____ 180—7
3,167,145  1/1965  Mackie _____ 180—7

FOREIGN PATENTS 1,272,678  8/1961  France.

BENJAMIN HERSH, Primary Examiner.